United States Patent [19]

Williams

[11] Patent Number: 4,672,286

[45] Date of Patent: Jun. 9, 1987

[54] INDUCTION MOTOR DRIVE CIRCUITS

[76] Inventor: Barry W. Williams, 108 Princes Gardens, West Acton, London, England

[21] Appl. No.: 793,099

[22] Filed: Oct. 29, 1985

[30] Foreign Application Priority Data

Nov. 21, 1984 [GB] United Kingdom ............... 8429450

[51] Int. Cl.⁴ .............................................. H02P 5/40
[52] U.S. Cl. ..................................... 318/798; 318/806
[58] Field of Search ............... 318/798, 806, 811, 812; 363/54–57

[56] References Cited

U.S. PATENT DOCUMENTS

| | | | |
|---|---|---|---|
| 3,387,205 | 6/1968 | Tesdall | 323/285 |
| 3,694,718 | 9/1972 | Graf et al. | 318/811 |
| 3,775,651 | 11/1973 | Graf et al. | 318/802 |
| 4,352,152 | 9/1982 | Smith | 318/811 |

Primary Examiner—David Smith, Jr.
Attorney, Agent, or Firm—Young & Thompson

[57] ABSTRACT

A drive circuit for a three-phase induction motor comprises an inverter bridge consisting of six bridge switches, and a logic speed controller which controls switching of the inverter bridge in dependence on the motor current as sensed by a total current sense resistor. The speed controller is arranged to switch the bridge switches so as to supply alternating current to each phase of the motor at a fundamental frequency which may be varied in accordacne with the required motor speed. However, additionally, at least during low speed operation, the speed controller switches at least three of the bridge switches at high frequency during each cycle of the fundamental frequency switching. In this case the switching points are not predetermined but rather occur when the current as sensed by the resistor reaches a preset limit for switch turn-off and when the current falls to a specified point for turn-on. Such a circuit can be realized simply and enables the motor to be driven at a range of speeds.

7 Claims, 7 Drawing Figures

INDUCTION MOTOR DRIVE CIRCUITS

This invention relates to drive circuits for induction motors, such as squirrel cage induction motors (SCIM) or wound rotor induction motors.

Normally a squirrel cage induction motor operating from a three-phase ($3\phi$), 50 Hz or 60 Hz mains voltage supply has a virtually fixed shaft operating speed. The shaft speed and hence developed torque can only be controlled effectively over a wide range by varying the supply frequency. Conventionally this is done by electronic control circuitry which varies the supply voltage V at the same time as the supply frequency f is varied so as to maintain the ratio V/f constant, thereby ensuring that the motor is fully fluxed at all times in operation. The V/f control is obtained using an inverter bridge circuit which produces square wave voltage at the required frequency across the motor. Furthermore the voltage is made to vary with the frequency by chopping the square wave at high frequency and varying the on-to-off duty cycle in accordance with the pulse width modulation (pwm) principle. Minimum motor losses occur with the inverter bridge circuit producing a square-wave representation of a sine wave. However, such control circuitry is complex and expensive to produce.

It is an object of the invention to provide a novel induction motor drive circuit which is of simple construction and can be produced at low cost.

According to the invention there is provided a drive circuit for an induction motor, the circuit comprising connection means for connection to a direct current supply, respective switching means associated with each phase of the motor and connected to the connection means for supplying current to the motor, sensing means for sensing the current supplied by way of the connection means, and speed control means for switching the switching means so as to supply alternating current to each phase of the motor at a fundamental frequency which may be varied in accordance with the required motor speed and, at least during low speed operation of the motor, for additionally switching the switching means at high frequency during each cycle of the fundamental frequency switching, the speed control means being operatively coupled to the sensing means and arranged to switch the switching means during high frequency switching in dependence on the current sensed by the sensing means.

Such a circuit can be realised much more simply than can the conventional circuit operating on the pulse width modulation principle. The circuit may produce an essentially square-wave current and need not produce a sinusoidal current or attempt to control the frequency and voltage so as to maintain the ratio V/f constant.

Conveniently the speed control means controls the switching means during high frequency switching so as to switch the switching means off when the sensed current rises above a preset limit value and so as to switch the switching means on when the sensed current falls below a limit value, preferably after a minimum interval of time has passed since switching off of the switching means. For example, the switching means incorporates a comparator for comparing a value proportional to the sensed current with a preset limit value and for supplying a control output in dependence on the result of that comparison. The sensing means may be arranged to sense the voltage drop across a resistance connected to the connection means.

The speed control means may comprise a voltage-to-frequency converter which produces a square-wave output having a frequency proportional to a voltage applied to the input of the converter in accordance with the required speed.

In a preferred embodiment of the invention the switching means associated with each phase of the motor comprises two switching elements connected in series and connectable at their common point to the associated motor winding. In this case the speed control means is preferably arranged to control the switching means during fundamental frequency switching such that each switching element is on for a period of a third of a cycle, and the periods for which the two switching elements of each switching means are on are separated by an interval of a sixth of a cycle. Furthermore, during high frequency switching, the speed control means conveniently switches only one of the two switching elements of each switching means at high frequency.

In order that the invention may be more fully understood, reference will now be made to the accompanying drawings, in which.

Figure 1:
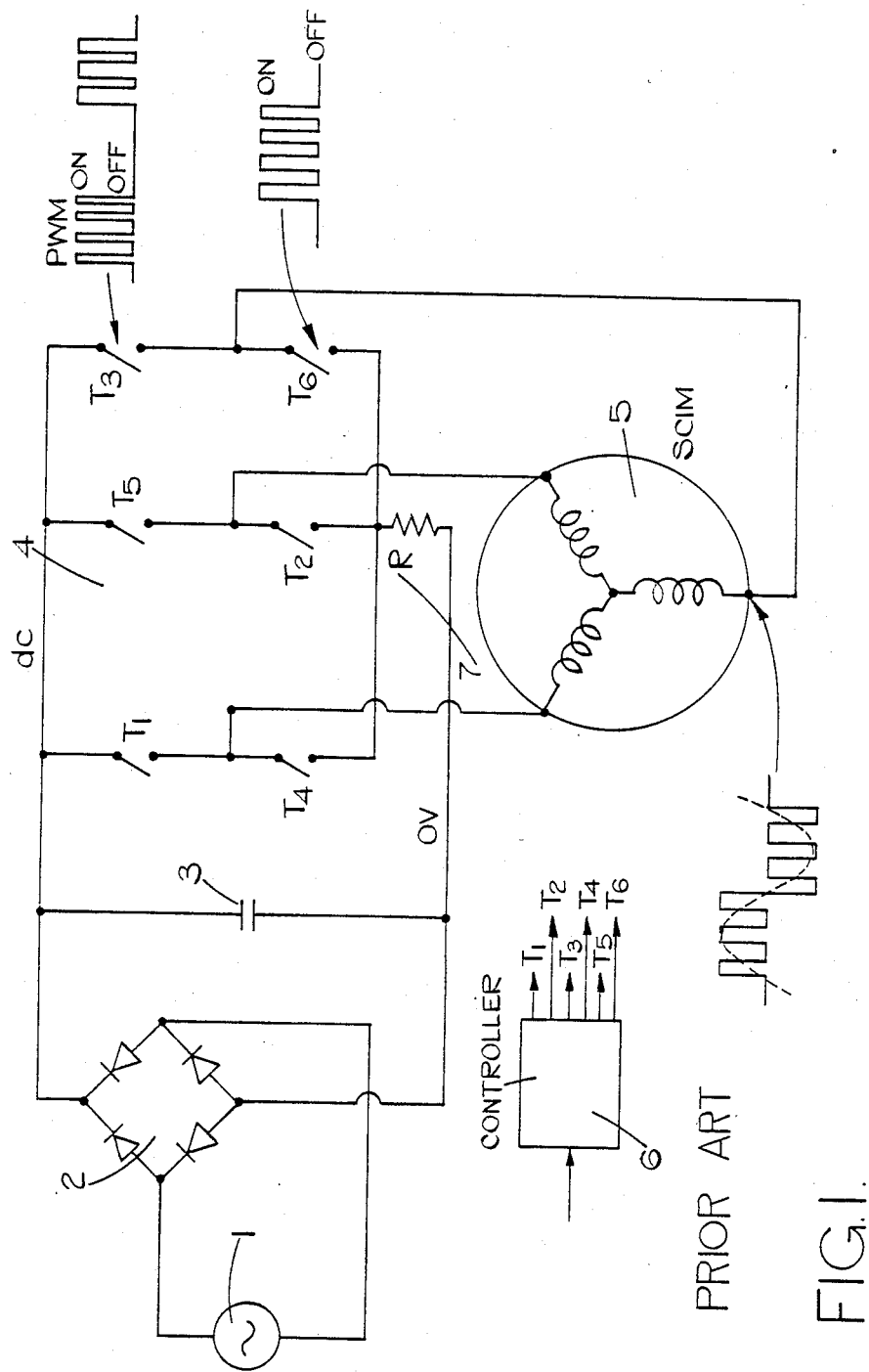
FIG. 1 is a generalised circuit diagram of a drive circuit for a squirrel cage induction motor.

Referring to the generalised circuit diagram of FIG. 1, this circuit comprises an a.c. voltage supply 1, a full wave bridge rectifier 2 which converts the a.c. voltage from the supply 1 into a d.c. voltage, a capacitor 3 which smooths the d.c. rail voltage, an inverter bridge 4 and a $3\phi$ squirrel cage induction motor 5. The inverter bridge 4 consists of six bridge switches T1 to T6 which are turned on and off sequentially, thereby producing square-wave $3\phi$ voltage across the motor 5. A logic controller 6 controls the switching of the bridge switches T1 to T6, and the circuit further includes a resistor 7 which is used to sense the total d.c. rail current.

The rate at which the switching of the bridge switches T1 to T6 is cycled determines the fundamental frequency supplied to the motor 5, and hence the speed at which the motor 5 is driven. The inverter bridge 4, which is known per se, is conventionally driven by one of two methods, termed 120° conduction and 180° conduction respectively. This refers to the time for which any one bridge switch conducts during a complete cycle. The manner in which switching of the bridge switches is sequenced in these two conduction methods is shown by the tables below which indicate those switches which are on in each of six successive portions of a cycle.

| | | | | | | | | | |
|---|---|---|---|---|---|---|---|---|---|
| 1 | $T_1$ | $T_2$ | $T_3$ | | | $T_1$ | $T_2$ | | |
| 2 | | $T_2$ | $T_3$ | $T_4$ | | | $T_2$ | $T_3$ | |
| 3 | | | $T_3$ | $T_4$ | $T_5$ | | | $T_3$ | $T_4$ |
| 4 | | | | $T_4$ | $T_5$ | $T_6$ | | | $T_4$ | $T_5$ |
| 5 | $T_1$ | | | | $T_5$ | $T_6$ | | | | $T_5$ | $T_6$ |
| 6 | $T_1$ | $T_2$ | | | | $T_6$ | | | | | $T_6$ | $T_1$ |

| 180 degree conduction | 120 degree conduction |
|---|---|

-continued

Futhermore the voltage which is supplied to the motor 5 is conventionally also varied with varying frequency in order to ensure that the ratio V/f remains constant. This is done using a pulse width modulation (pwm) principle according to which the controller 6 superimposes high frequency pwm switching on the above relatively low frequency switching of the bridge switches T1 to T6. This results in the square wave voltage supplied to the motor 5 being chopped at high frequency with the on-to-off duty cycle being varied in dependence on the frequency.

Ideally the pwm switching is arranged to produce a square-wave representation of a sine wave so as to minimise motor losses and eliminate lower order harmonics which would otherwise produce torque oscillations and detract from the motor's performance and efficiency. However, the necessary circuitry for producing such pwm switching is both complicated and expensive.

Figure 2:
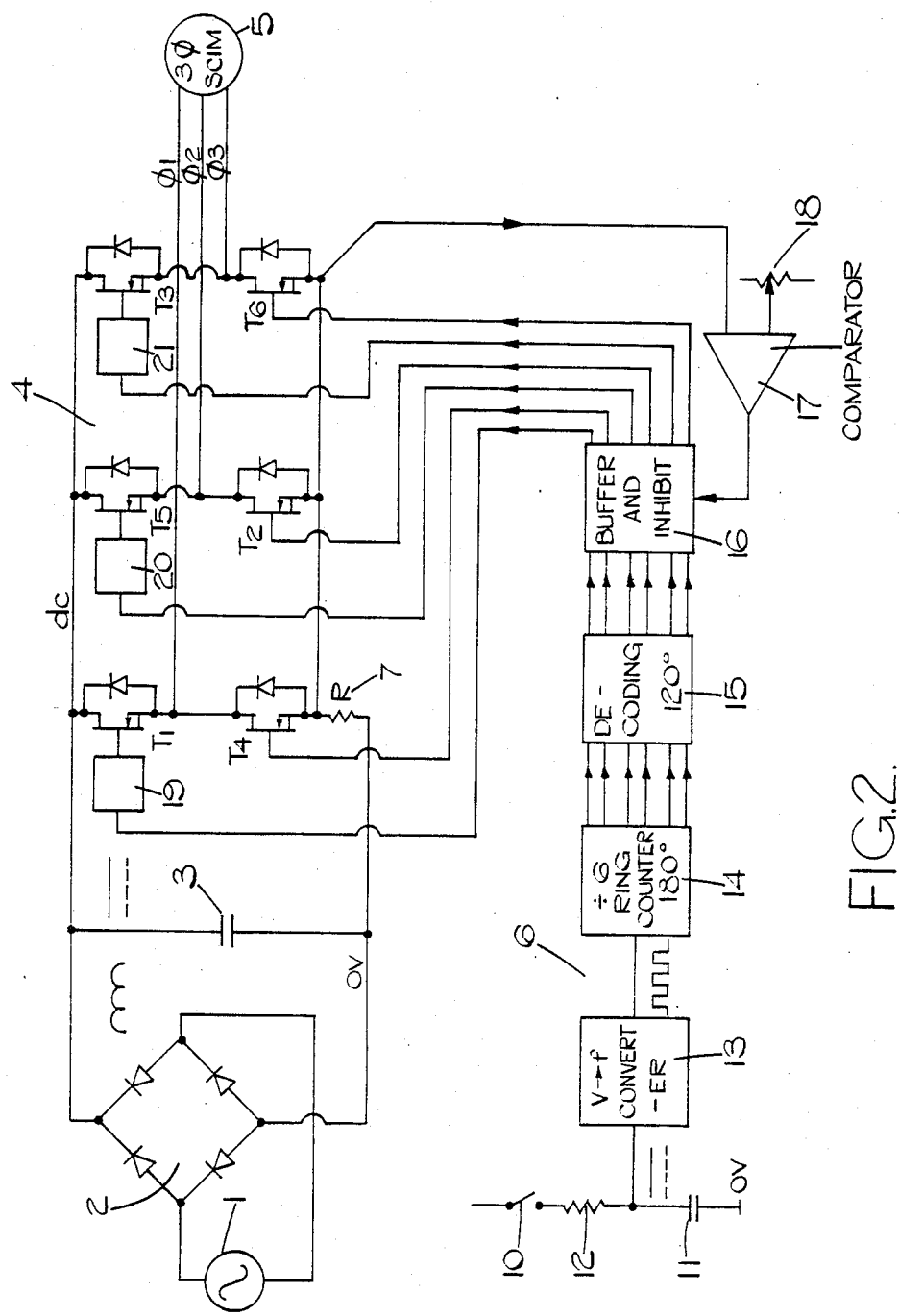
FIG. 2 is a circuit diagram of a preferred embodiment of drive circuit in accordance with the invention.

FIG. 2 shows a drive circuit in accordance with the invention. This circuit incorporates a logic controller 6 which controls the switching of the inverter bridge 4 by a technique other than the conventional pwm principle which furthermore does not require the ratio V/f to be maintained constant. The technique does not attempt to produce a sinusoidal current, but rather produces a square-wave current. Basically the technique comprises superimposing on the normal sequencing of the bridge switches T1 to T6 a high frequency switching according to which the switching points are not predetermined, as in the pwm system, but rather occur when the current reaches a preset limit. Once this limit is reached, one or both of the currently conducting bridge switches is turned off and the current falls. When the current falls to a specified point (hysteresis) the or each switch is turned on and the current rises again.

Figure 3:
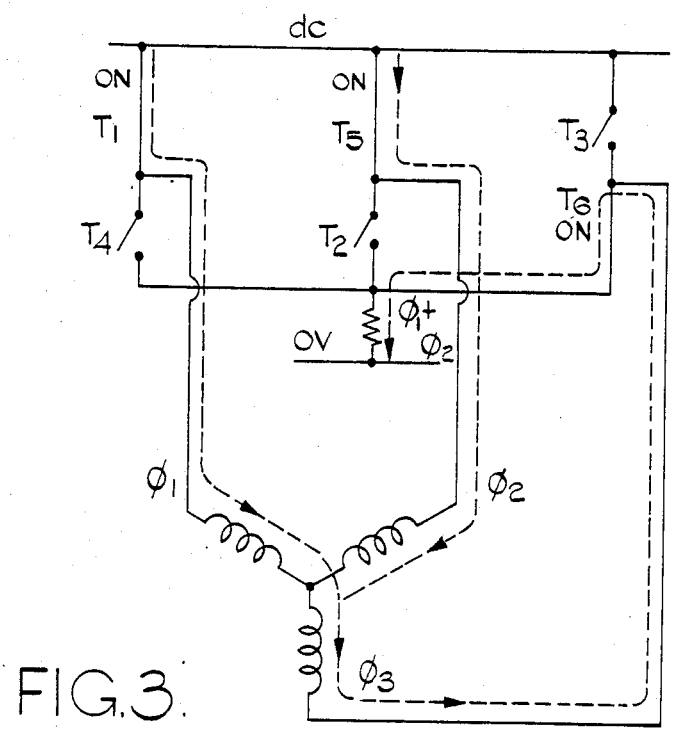
FIGS. 3 and 4 are explanatory diagrams.

This technique relies on continual monitoring of the motor current. Thus the problem exists of being able to measure the three phases of the motor current at ground level. The three motor windings are not at ground potential, so that any direct measurement of the currents in the windings must be translated to ground level which is both costly and complicated. For this reason it is proposed to monitor the motor current by means of the total current sense resistor 7. However, as will be appreciated by referring to FIG. 3, the current through this resistor 7 will represent the current of more than one phase if the inverter bridge 4 is controlled by the 180° conduction method. Thus, in this case, the current of each phase cannot be determined by this technique.

Figure 4:
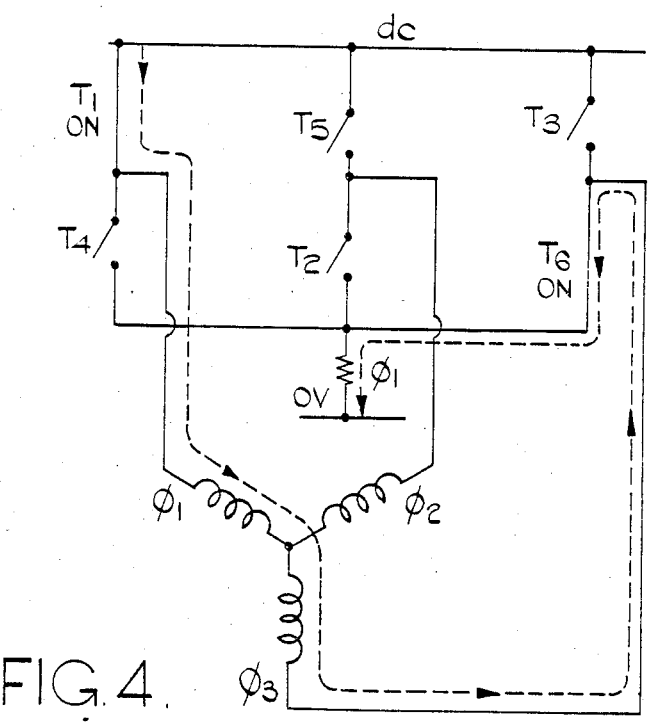

It will further be appreciated, by referring to FIG. 4, that this same problem does not arise when the inverter bridge 4 is controlled according to the 120° conduction method. In this case, at any one time, the voltage drop across the resistor 7 represents the phase current in the motor 5. This is because, with 120° conduction, only two bridge switches are ever on, that is one for current into the motor and the other for that same current to pass out of the motor.

Accordingly the controller 6 of the circuit of FIG. 2 controls the inverter bridge 4 by 120° conduction.

A further simplification in circuit design is achieved by using 120° conduction in the circuit of FIG. 2 in place of 180° conduction. This is because, with 180° conduction, when one bridge switch (say T1) turns off, the complementary bridge switch (T4) immediately turns on. However, in practice, a dead time must be provided between T1 turning off and T4 turning on, so as to obviate any possibility of T1 and T4 being on simultaneously for a short overlap period which would result in a short-circuit occurring through T1 and T4 across the d.c. rail. The provision of such a dead time requires the use of additional circuitry. By contrast with 120° conduction, a 60° period exists between switching of complementary devices, thus providing an inherent dead time.

Figure 5:
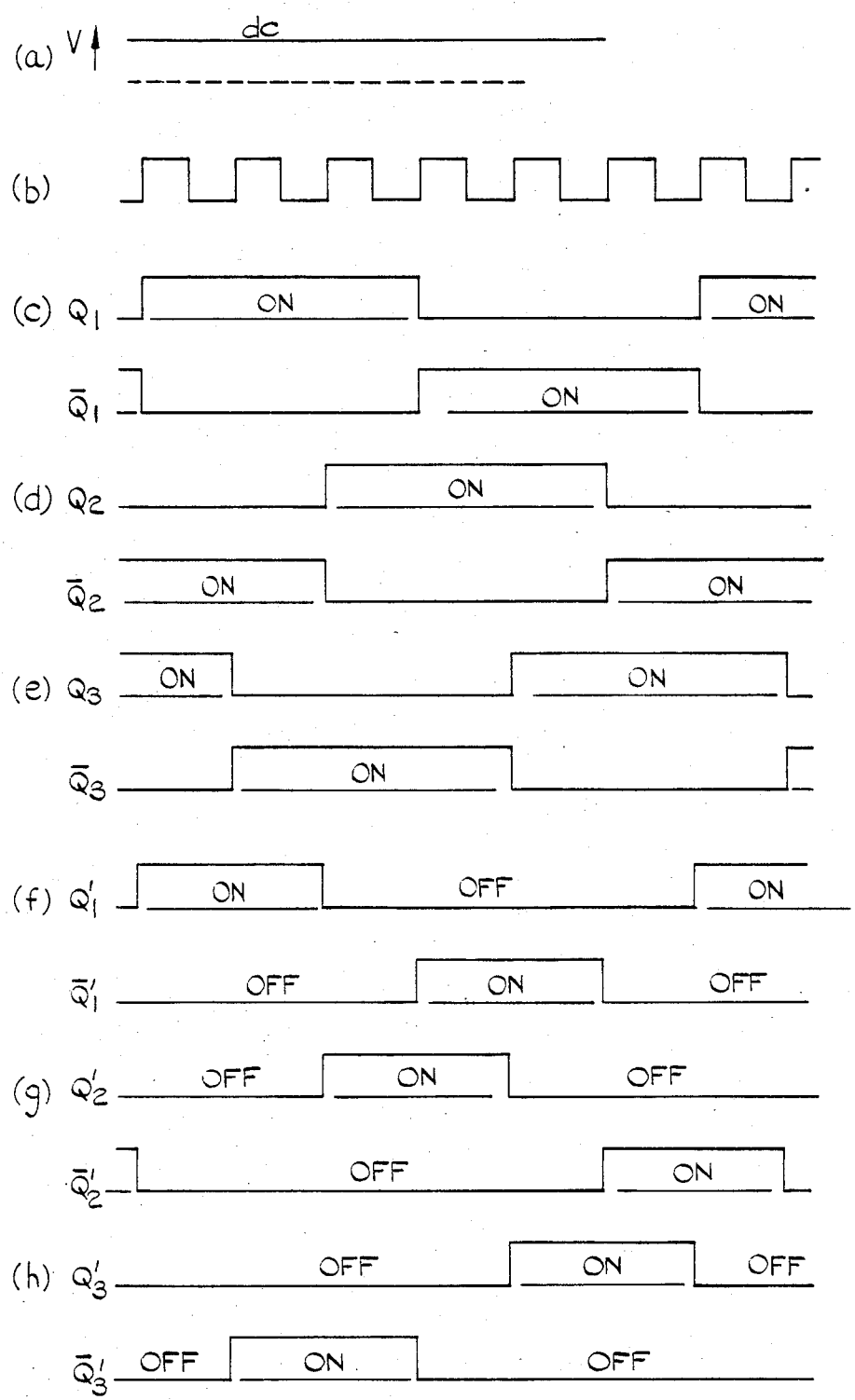
FIG. 5 shows various waveforms produced in the circuit of FIG. 2.

Referring to FIGS. 2 and 5, the controller 6 of the circuit of FIG. 2 functions as follows. The required motor speed is adjusted by varying the d.c. voltage level at the input of the controller 6, as shown at (a) of FIG. 5, by suitable adjusting means (not shown). When the on/off switch 10 is closed, a capacitor 11 charges through a resistor 12 with an RC time constant with the effect that, as the capacitor voltage increases from zero, the motor 3-phase supply frequency increases. The d.c. voltage input is converted to a square wave having a frequency proportional to the input voltage, as shown at (b) of FIG. 5, by means of a voltage-to-frequency converter 13. The steady state frequency of the output is six times the required motor supply frequency. The output of the converter 13 is then used to clock a divide-by-six twisted ring counter 14 comprising three J-K flip-flops. The arrangement of this counter 14 is such that complementary square-wave output signals are provided from the Q and $\overline{Q}$ outputs of each flip-flop, as shown at (c) of FIG. 5, and the outputs of each flipflop are spaced by 120° from the corresponding outputs of the other flip flops, as shown at (c), (d) and (e) of FIG. 5. The frequency of each square-wave output is a sixth of the input frequency to the counter 14, and it will be appreciated that these outputs are of a form suitable for 180° conduction.

The six outputs are then supplied to decoding circuitry 15 comprising simple logic gates which are used to decode the 180° conduction waveforms to produce 120° conduction waveforms, as shown at (f), (g) and (h) of FIG. 5. The outputs of the decoding circuitry 15 are supplied to buffer and inhibit circuitry 16 which serves to switch the bridge switches T1 to T6 which are in the form of MOS field-effect transistors in the circuit of FIG. 2. The bridge diodes shown in this circuit are internal parasitic diodes of these transistors.

The voltage across the resistor 7 represents the motor current, and a comparator 17 compares this voltage with a limit voltage determined by a preset reference resistor 18. These voltages in fact represent current levels. When the motor current is below the reference level, the comparator output does not affect the buffer and inhibit circuitry 16. However, when the motor current reaches the preset limit, the comparator output changes state and blanks the outputs from the buffer and inhibit circuitry 16 to the upper bridge switches T1, T5 and T3, the outputs to the lower bridge switches T4, T2 and T6 being unaffected. Thus the upper bridge switch which is currently on as determined by the output waveforms from the 120° conduction decoding circuitry 15 is turned off, and the current through the resistor 7 decreases. Thereafter, at a certain level determined by the comparator hysteresis, and after a minimum length of time, the comparator again changes state, thus unblocking the outputs from the buffer and inhibit circuitry 16 to the upper bridge switches T1, T5 and T3. The appropriate one of these switches accordingly turns on and the load current builds up again.

It will be appreciated from the above discussion of 120° conduction that only two bridge switches are ever on at one time, that is one of the upper switches T1, T5 and T3 and one of the lower switches T4, T2 and T6. Of the two switches which are on at any one time, it is always the upper of the two switches which is turned on and off by the current limiting technique. Furthermore the current limiting switching of the upper bridge switches is superimposed on the 120° switching of these switches as determined by the outputs of the decoding circuitry 15.

Buffer and inhibit circuitry 16 comprises CMOS logic gates which directly control the lower bridge switches T4, T2 and T6 and control the upper bridge switches T1, T5 and T3 by way of translation stages 19, 20 and 21 respectively. Although all the bridge switches are shown as N-channel devices, the upper switches can be either N or P-channel devices. Furthermore all the switches can be in the form of bipolar transistors.

Figure 6:
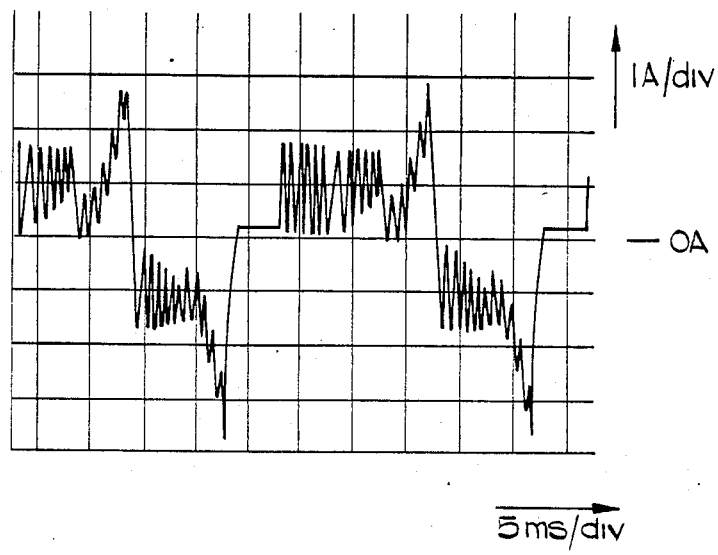
FIGS. 6 and 7 show the current waveform produced in one phase of the motor by the circuit of FIG. 2 during low-speed operation and high-speed operation respectively.
Figure 7:
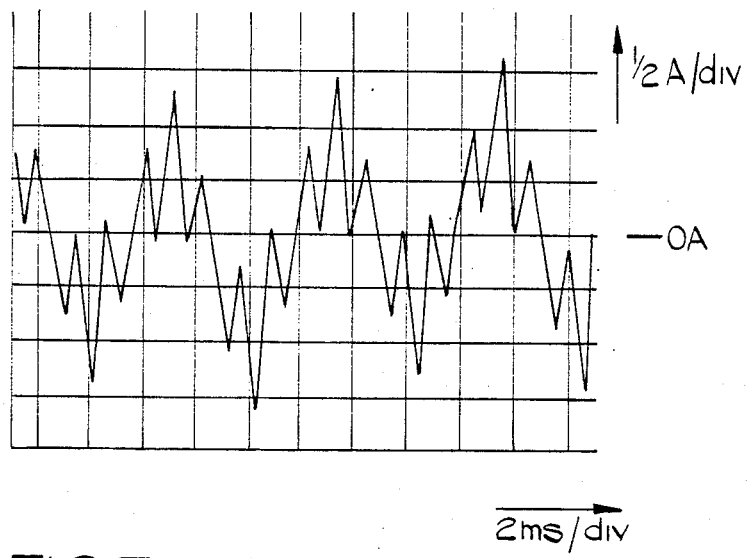

Typical current waveforms produced in one phase of the motor by the circuit of FIG. 2 are shown in FIGS. 6 and 7. FIG. 6 shows a waveform produced at a low cycling frequency, that is at a low motor speed. This waveform shows the current limiting mechanism operating. The current reaches the preset limit of about 2 amps and the appropriate upper bridge switch then turns off. After about 250 microseconds the bridge switch is turned on again, the current builds up and again reaches the preset limit so that the mechanism is repeated. FIG. 7 shows a waveform at a high cycling frequency and high motor speed. In this case the frequency is such that no current limiting occurs because of high winding reactance and high motor back-e.m.f. Thus the waveform corresponds to the conventional 120° conduction waveform.

The drive circuit of FIG. 2 is of simple construction and can be produced at relatively low cost for a wide range of applications. Examples of suitable applications are for driving small compressors and pumps, as used in beer pumping for instance. The motor starts from rest, quickly speeds up to 7000 r.p.m., maintains a constant speed and is then switched off. At 7000 r.p.m. (representing a bridge output frequency of 125 Hz), no current chopping occurs under normal load conditions. The motor current waveforms are then very similar to those delivered from a conventional inverter bridge circuit. Thus motor losses dissipated as heat due to this square-wave current during run-up are minimal.

The circuit of FIG. 2 is also suitable for applications where different operating speeds are required, such as is the case with washing machines where the wash speed may be 52 r.p.m. and the spin speed may be 1000 r.p.m. With this circuit the 52 r.p.m. may be developed with square wave current, whilst the 1000 r.p.m. may be developed with the conventional waveform produced by this circuit due to increased motor reactance and back-e.m.f. at high speed, as shown in FIG. 7. The circuit is also suitable for driving permanent magnet motors, requiring the addition of minimal extra low power logic components.

The advantages of using square phase current and 120° conduction in driving an induction motor are simple phase current measurement and control leading to significantly simpler and cheaper control electronics.

I claim:

1. A drive circuit for a three-phase induction motor, the circuit comprising first and second switching means associated with each phase of the motor, connection means for connecting all the first switching means to a common supply rail of one polarity and for connecting all the second switching means to a common supply rail of the other polarity, speed control means for cyclically switching the first switching means to connect each phase in turn to the supply rail of said one polairity and for cyclically switching the second switching sense to connect each phase in turn to the supply rail of said other polarity so as to supply alternating current to each phase of the motor at a fundamental frequency which may be varied in accordance with the required motor speed, the speed control means being operative to render each switching means conductive for no more than a third of a cycle and such that, at any instant, no more than one of the first switching means associated with one phase and one of the second switching means associated with another phase are rendered conductive together, sensing means for sensing the current supplied to the motor by the connection means which corresponds to the current through a single phase of the motor at any instant, and current limiting means operative, at least during low speed operation of the motor, to switch at least one of the switching means which are conductive at any instant on and off at high frequency relative to the fundamental switching frequency and to switch said at least one switching means off when the current sensed by the sensing means exceeds a limit value.

2. A drive circuit according to claim 1, wherein the current limiting means is arranged to switch said at least one switching means on when the sensed current falls below a minimum value after a minimum interval of time has passed since switching off of the switching means.

3. A drive circuit according to claim 1, wherein the current limiting means incorporates a comparator for comparing a value proportional to the sensed current with a preset limit value and for supplying a control output in dependence on the result of that comparison.

4. A drive circuit according to claim 1, wherein the sensing means is arranged to sense the voltage drop across a resistance connected to the connection means.

5. A drive circuit aocording to claim 1, wherein the speed control means comprises a voltage-to-frequency converter which produces a square-wave output having a frequency proportional to a voltage applied to the input of the converter in accordance with the required speed.

6. A drive circuit according to claim 1, wherein the switching means associated with each phase of the motor comprises two switching elements connected in series and connectable at their common point to the associated motor winding.

7. A drive circuit according to claim 6, wherein the speed control means is arranged to control the switching means during fundamental frequency switching such that each switching element is on for a period of a third of a cycle, and the periods for which the two switching elements of each switching means are on are separated by an interval of a sixth of a cycle.

* * * * *